(No Model.)
P. H. DUDLEY.
RAILWAY TIE PLATE.
No. 408,960. Patented Aug. 13, 1889.
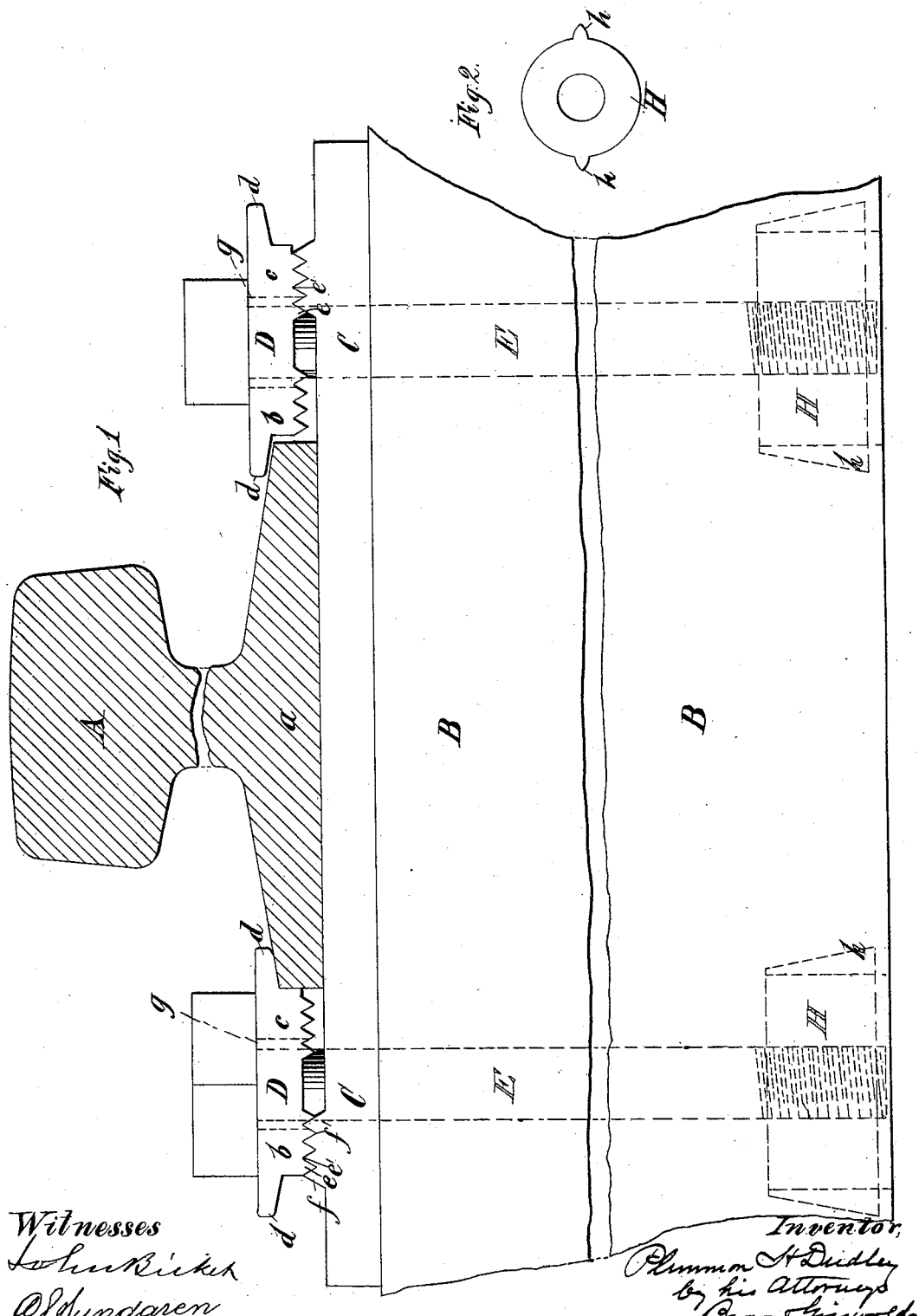

UNITED STATES PATENT OFFICE.

PLIMMON H. DUDLEY, OF NEW YORK, N. Y.

RAILWAY-TIE PLATE.

SPECIFICATION forming part of Letters Patent No. 408,960, dated August 13, 1889.

Application filed April 4, 1889. Serial No. 305,963. (No model.)

*To all whom it may concern:*

Be it known that I, PLIMMON H. DUDLEY, of the city, county, and State of New York, have invented a certain new and useful Improvement in Railway-Tie Plates, of which the following is a specification.

My improvement relates to means for securing the foot of the rail so as to prevent displacement of the rail and at the same time give an inclosed bearing-surface upon the ties, checking the ordinary rapid abrasion of the wood-fibers of the tie.

I will describe a tie-plate embodying my improvement in detail, and then point out the novel features in the claim.

In the accompanying drawings, Figure 1 is a side view of a portion of a tie, a plate mounted thereon, and certain securing devices employed in conjunction with said plate and a portion of a rail, the rail being shown in section. Fig. 2 is a plan or top view of a certain nut which may be employed.

Similar letters of reference designate corresponding parts in both figures.

A designates the rail, and $a$ the foot or base thereof.

B designates a railway-tie.

C designates a tie-plate, which tie-plate is, as usual, made of metal.

D designates securing devices by which the rail is secured upon the tie-plate, and by which the displacement of the rail is prevented. The securing devices D comprise, essentially, two portions $b\ c$. Each of the portions $b\ c$ is provided with a horizontally-extending flange or lip $d$. In the example of my improvement shown the securing devices are reversible, so that whichever of the portions $b\ c$ is next the rail the flange $d$ thereof will extend over the foot of the rail. I provide the under side of both the portions $b\ c$ with projections $e$, between which are intermediate grooves or recesses $e'$. As shown, such projections are tooth-shaped, the grooves or recesses $e'$ being between the tooth-shaped projections; or, in other words, such under sides are serrated. The serrations preferably extend throughout the width of the securing devices. Instead of being serrated, however, any other suitable form of projections and grooves or recesses may be employed.

Near the outer ends of the tie-plate C the same is provided upon its upper side with projections $f$ and grooves or recesses $f'$, corresponding in shape to the projections and grooves or recesses upon the securing devices D. When the securing devices are in place, the projections on the one will extend into the recesses or grooves on the other, and when the securing devices are firmly held against the tie-plate will prevent the lateral movement of the securing devices.

The reversibility of the securing devices is for the purpose of accommodating rails the feet or bases of which are of different widths. By placing the projections upon one of the portions of the securing devices D farther inward from the edges of the securing devices than those upon the other portions it will be readily seen that according as the one or the other of the portions engages the tie-plate the securing devices will be nearer to or farther from each other.

At the left of Fig. 1 I have shown the projections upon the portions $c$ of the securing device as farther inward from the edge of the securing device than those upon the portion $b$ thereof. It will be quite apparent that if the securing device be reversed, so that the projections upon the portion $c$ engage the tie-plate, the securing device will occupy a position farther from the foot of the rail than it does, as shown. This reversed position I have illustrated with a securing device, (shown at the right of Fig. 1,) intentionally leaving a space between the foot of the rail and the adjacent perpendicular edge of the securing device. Although so shown, however, it is to be understood that the securing device is always to fit snugly against the foot of the rail when in position. The distance to which the securing device may be moved toward or from the foot of the rail by reversing the securing device is, as illustrated, equal to one-half the width at its base of one of the projections $e$. By reversing the securing devices D in different ways provision is afforded for accommodating the base of the rails varying considerably in width.

E designates bolts for securing the securing devices and the tie-plate to the tie. These bolts extend through longitudinally-extending slots $g$ in the securing devices D, which slots afford provision for changing position of the securing devices relatively to the bolts.

I have shown a convenient means for securing the bolts to the tie, consisting in boring suitable holes upon the under sides of the ties. Into these holes I force or drive nuts H, (shown more clearly in Fig. 2,) which nuts in this instance are circular and are provided with projections $h$. The nuts are driven in so that the projections $h$ will extend with the grain of the wood. The projections prevent the rotation of the nuts within the holes. The tie having being properly bored, the bolts are passed down through the holes and secured in the nuts. By this means the securing devices are firmly engaged with the tie-plate and operate to hold the rail in position, while at the same time the tie-plate is firmly secured to the tie, checking the abrasion of the wood-fibers.

By sinking the nuts into the tie beyond the outer surface thereof the tie may be readily slid along beneath the rails without its passage being obstructed by projections upon its exterior.

What I claim as my invention, and desire to secure by Letters Patent, is—

The combination, with a railway-rail, of a tie, a tie-plate provided upon its upper side near its ends with projections and intermediate grooves or recesses, and reversible securing devices provided upon their under sides and near opposite ends with projections and intermediate grooves or recesses adapted to engage the projections and grooves or recesses upon the tie-plate, the projections upon one of the sides of the securing devices being arranged farther inward from the edges of the securing devices than those upon the other side, substantially as specified.

PLIMMON H. DUDLEY.

Witnesses:
 FREDK. HAYNES,
 K. E. PEMBLETON.